US011939801B2

(12) United States Patent
Pavnick et al.

(10) Patent No.: US 11,939,801 B2
(45) Date of Patent: Mar. 26, 2024

(54) HINGE BRACKET

(71) Applicant: WHIRLPOOL CORPORATION, Benton Harbor, MI (US)

(72) Inventors: Ian Pavnick, Michigan City, IN (US); Ryan M. Post, Coloma, MI (US); Michael S. Richards, St. Joseph, MI (US); Chad J. Rotter, Saugatuck, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 105 days.

(21) Appl. No.: 17/355,474

(22) Filed: Jun. 23, 2021

(65) Prior Publication Data

US 2021/0355727 A1 Nov. 18, 2021

Related U.S. Application Data

(62) Division of application No. 16/418,308, filed on May 21, 2019, now Pat. No. 11,072,956.

(51) Int. Cl.
*F25D 23/02* (2006.01)
*E05D 7/081* (2006.01)
*E05D 7/12* (2006.01)
*E05D 11/06* (2006.01)

(52) U.S. Cl.
CPC .............. *E05D 11/06* (2013.01); *E05D 7/081* (2013.01); *E05D 7/12* (2013.01); *F25D 23/028* (2013.01); *E05Y 2900/31* (2013.01); *F25D 2323/024* (2013.01)

(58) Field of Classification Search
CPC . F16B 21/02; E05D 7/12; E05D 7/081; E05D 7/123; E05D 15/507; F25D 2323/024
See application file for complete search history.

(56) References Cited

U.S. PATENT DOCUMENTS 1,666,783 A * 4/1928 Kries ........................ F16B 5/10 411/337
1,909,654 A 5/1933 Brown et al.
1,930,645 A * 10/1933 Ellis ...................... F25D 23/067 411/549
(Continued)

FOREIGN PATENT DOCUMENTS

CN 1208167 A 2/1999
CN 1213066 A 4/1999
(Continued)

*Primary Examiner* — Emily M Morgan
(74) *Attorney, Agent, or Firm* — Price Heneveld LLP

(57) ABSTRACT

A hinge bracket assembly includes an anchor plate. A retention member extends perpendicular to the anchor plate. The anchor plate defines a first receiving aperture. A hinge plate is aligned with the anchor plate and includes a hinge arm and a protrusion. The protrusion extends from an edge of the hinge plate opposite the hinge arm. The hinge plate defines a second receiving aperture aligned with the first receiving aperture when the protrusion is received by a space defined by the retention member. A locking arm is rotatable between an unlocked position and a locked position and is configured to be at least partially received by the first and second receiving apertures to couple the anchor plate and the hinge plate.

5 Claims, 12 Drawing Sheets

(56) References Cited

U.S. PATENT DOCUMENTS

| | | | | | |
|---|---|---|---|---|---|
| 2,555,291 | A * | 5/1951 | Poupitch | F16B 5/10 411/549 |
| 3,869,753 | A | 3/1975 | Boback | |
| 3,956,803 | A * | 5/1976 | Leitner | F16B 21/02 411/349 |
| 5,870,801 | A | 2/1999 | Kim | |
| 5,884,366 | A | 3/1999 | Jeong | |
| 5,960,518 | A | 10/1999 | Jeong | |
| 6,070,300 | A * | 6/2000 | Shin | E05D 7/1044 16/382 |
| 6,085,385 | A * | 7/2000 | Joo | E05D 7/12 16/268 |
| 8,245,352 | B2 | 8/2012 | Park | |
| 9,170,045 | B2 * | 10/2015 | Oh | E05D 11/0081 |
| 9,383,135 | B2 | 7/2016 | Park et al. | |
| 9,885,514 | B2 | 2/2018 | Giacomini et al. | |
| 10,415,284 | B2 | 9/2019 | Kim | |
| 10,480,228 | B2 | 11/2019 | Kim et al. | |
| 2004/0237257 | A1 | 12/2004 | Pohl | |
| 2009/0080999 | A1 * | 3/2009 | Dunn | F16B 21/02 411/500 |
| 2009/0289536 | A1 * | 11/2009 | Park | F25D 23/028 312/405 |
| 2010/0033067 | A1 | 2/2010 | Kim et al. | |
| 2012/0037642 | A1 | 2/2012 | Sun et al. | |
| 2012/0038259 | A1 | 2/2012 | Lee et al. | |
| 2013/0287486 | A1 * | 10/2013 | Tseng | F16B 5/10 403/314 |
| 2015/0089778 | A1 * | 4/2015 | Tisol, Jr. | F16B 21/02 24/663 |
| 2017/0159993 | A1 * | 6/2017 | Giacomini | E05D 7/1044 |
| 2018/0156531 | A1 | 6/2018 | Heisswold et al. | |
| 2018/0298657 | A1 | 10/2018 | Kim | |
| 2020/0370350 | A1 * | 11/2020 | Pavnick | E05D 7/081 |
| 2021/0062561 | A1 * | 3/2021 | Pavnick | E05D 5/065 |

FOREIGN PATENT DOCUMENTS

| | | | | | |
|---|---|---|---|---|---|
| CN | 1214442 | A | | 4/1999 | |
| CN | 1214443 | A | | 4/1999 | |
| CN | 201421232 | Y | | 3/2010 | |
| CN | 102425350 | A | | 4/2012 | |
| CN | 104963577 | A | | 10/2015 | |
| CN | 105507708 | A | | 4/2016 | |
| CN | 106193863 | A | | 12/2016 | |
| EP | 3173718 | A1 | | 5/2017 | |
| GB | 2330174 | A | | 4/1999 | |
| JP | 978927 | A | | 3/1997 | |
| KR | 19980072590 | A | * | 11/1998 | |
| KR | 19980072590 | A | | 11/1998 | |
| KR | 19990008687 | U | * | 3/1999 | |
| KR | 19990010384 | U | * | 3/1999 | |
| KR | 200165712 | Y1 | | 1/2000 | |
| KR | 20000000706 | U | * | 1/2000 | |
| KR | 200169565 | Y1 | * | 2/2000 | F25D 23/028 |
| KR | 200185716 | Y1 | | 7/2000 | |

* cited by examiner

HINGE BRACKET

CROSS-REFERENCE TO RELATED APPLICATIONS

This application is a divisional of U.S. patent application Ser. No. 16/418,308, filed on May 21, 2019, now U.S. Pat. No. 11,072,956, entitled HINGE BRACKET, the entire disclosure of which is hereby incorporated by reference.

BACKGROUND OF THE DISCLOSURE

The present disclosure generally relates to a hinge bracket, and more specifically, to a hinge bracket for an appliance door.

SUMMARY OF THE DISCLOSURE

According to one aspect of the present disclosure, a hinge bracket assembly includes an anchor plate with a retention member and a stop. The retention member and the stop extend perpendicularly from the anchor plate. The anchor plate defines a first receiving aperture. A hinge plate includes a hinge arm and a protrusion. The protrusion extends from an edge of the hinge plate opposite the hinge arm. The hinge plate defines a second receiving aperture aligned with the first receiving aperture when the protrusion is received by a slot defined by the retention member to couple the hinge plate with the anchor plate. A locking arm is rotatable between an unlocked position and a locked position. The locking arm includes a first portion configured to be at least partially received by the first and second receiving apertures. A second portion is positioned parallel and co-planar with the first portion. The second portion is configured to abut the stop of the anchor plate when the locking arm is in the locked position.

According to another aspect of the present disclosure, a hinge bracket assembly includes an anchor plate. A retention member extends perpendicular to the anchor plate. The retention member defines a slot and a retention space. The slot is defined between the retention space and the anchor plate. The anchor plate defines a first receiving aperture. A hinge plate includes a hinge arm and a protrusion. The protrusion extends from an edge of the hinge plate opposite the hinge arm. The hinge plate defines a second receiving aperture aligned with the first receiving aperture when the protrusion is received by the space defined by the retention member. A locking arm is rotatable between an unlocked position and a locked position. The locking arm includes a body with an upper portion and a lower portion. A nose extends from the lower portion and is positioned at an angle relative to the lower portion. The nose is received by the first and second receiving apertures and the upper portion is engaged with the retention space of the retention member when the locking arm is in the locked position.

According to yet another aspect of the present disclosure, a hinge bracket assembly includes an anchor plate. A retention member extends perpendicular to the anchor plate. The anchor plate defines a first receiving aperture. A hinge plate is aligned with the anchor plate and includes a hinge arm and a protrusion. The protrusion extends from an edge of the hinge plate opposite the hinge arm. The hinge plate defines a second receiving aperture aligned with the first receiving aperture when the protrusion is received by a space defined by the retention member. A locking arm is rotatable between an unlocked position and a locked position and is configured to be at least partially received by the first and second receiving apertures to couple the anchor plate and the hinge plate.

These and other features, advantages, and objects of the present disclosure will be further understood and appreciated by those skilled in the art by reference to the following specification, claims, and appended drawings.

Figure 1A:
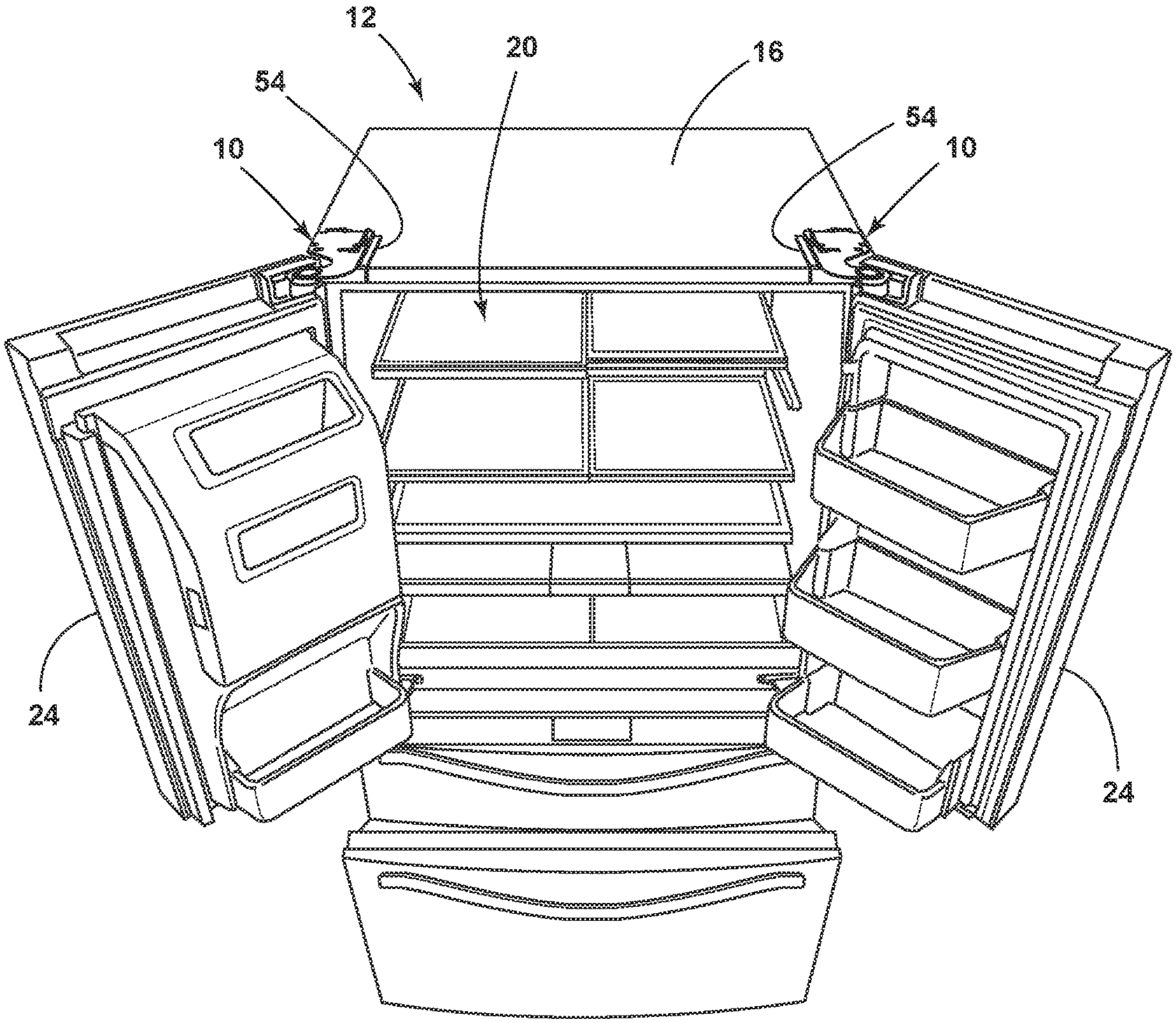
FIG. 1A is a top perspective view of an appliance including a hinge bracket assembly, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to a hinge bracket. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal," and derivatives thereof shall relate to the disclosure as oriented in FIG. 1A. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1A-13, reference numeral 10 generally designates a hinge bracket assembly. The hinge bracket assembly 10 may include an anchor plate 14. A retention member 18 may extend perpendicularly from the anchor plate 14. The anchor plate 14 may define a first receiving aperture 22. A hinge plate 26 is aligned with the anchor plate 14. The hinge plate 26 may include a hinge arm 30 and a protrusion 34. The protrusion 34 may extend from an edge 38 of the hinge plate 26 opposite the hinge arm 30. The hinge plate 26 may define a second receiving aperture 42 aligned with the first receiving aperture 22 when the protrusion 34 is received by a slot 46 defined by the retention member 18. A locking arm 50 may be rotatable between an unlocked position and a locked position. The locking arm 50 may be configured to be at least partially received by the first and second receiving apertures 22, 42 to securely couple the hinge plate 26 with the anchor plate 14.

Figure 1B:
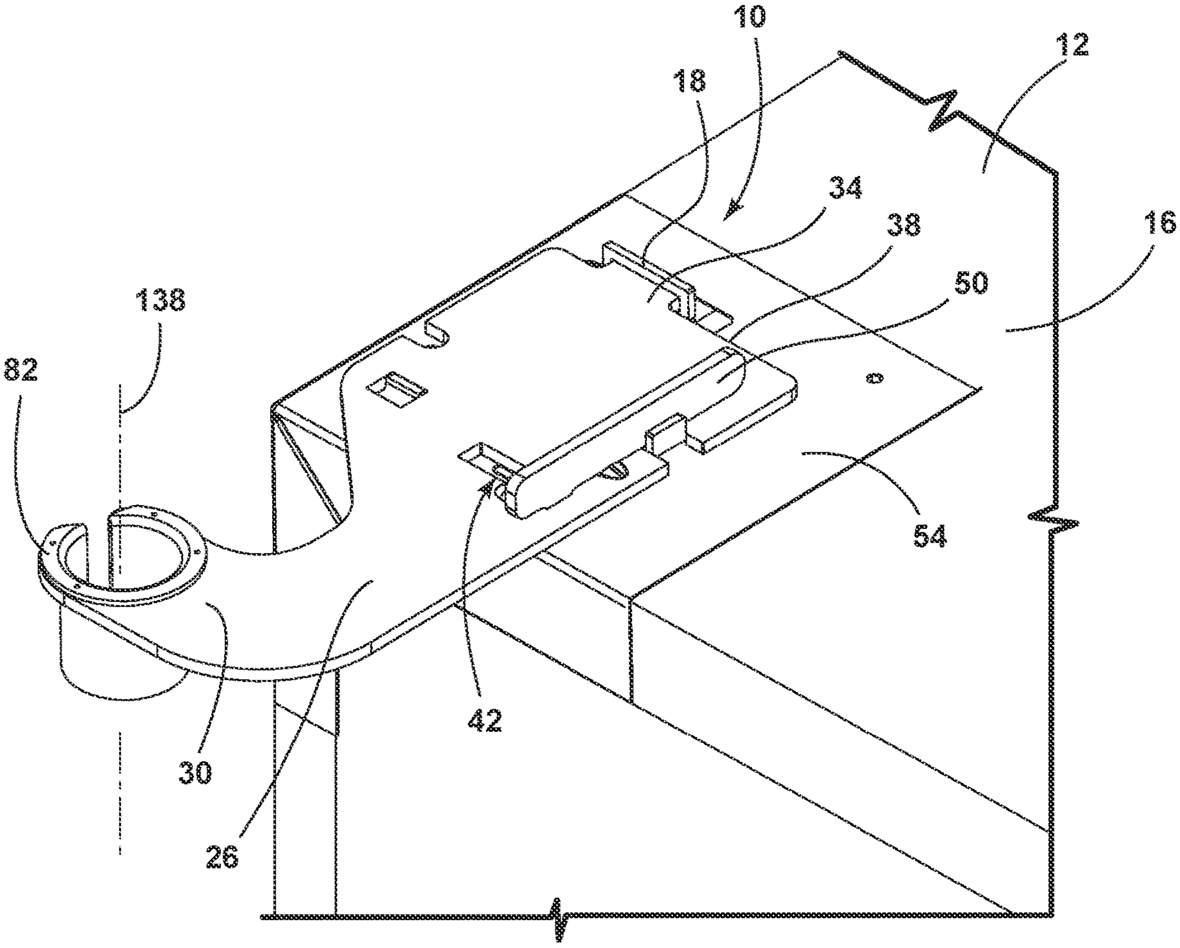
FIG. 1B is a side perspective view of the hinge bracket assembly coupled with the appliance of FIG. 1A.

Referring now to FIGS. 1A and 1B, an appliance 12 is shown including a cabinet 16 defining a compartment 20. The compartment 20 may be configured as a fresh food compartment, a freezer compartment, or any other desired compartment known in the art. A door 24 is configured to seal the compartment 20 and is operable between open and closed positions. The hinge bracket assembly 10 may be coupled with the appliance 12 proximate a corner of the cabinet 16. The door 24 may be rotatably coupled with the hinge bracket assembly 10.

Figure 2:
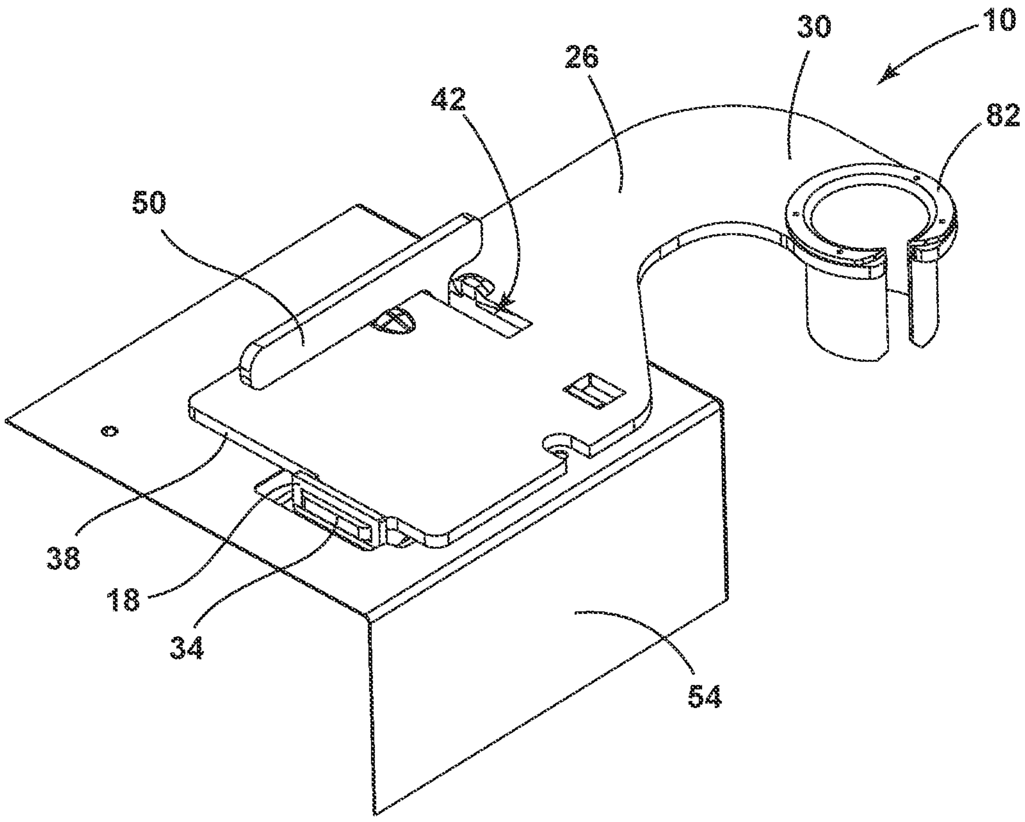
FIG. 2 is a side perspective view of a hinge bracket assembly, according to various examples.
Figure 3:
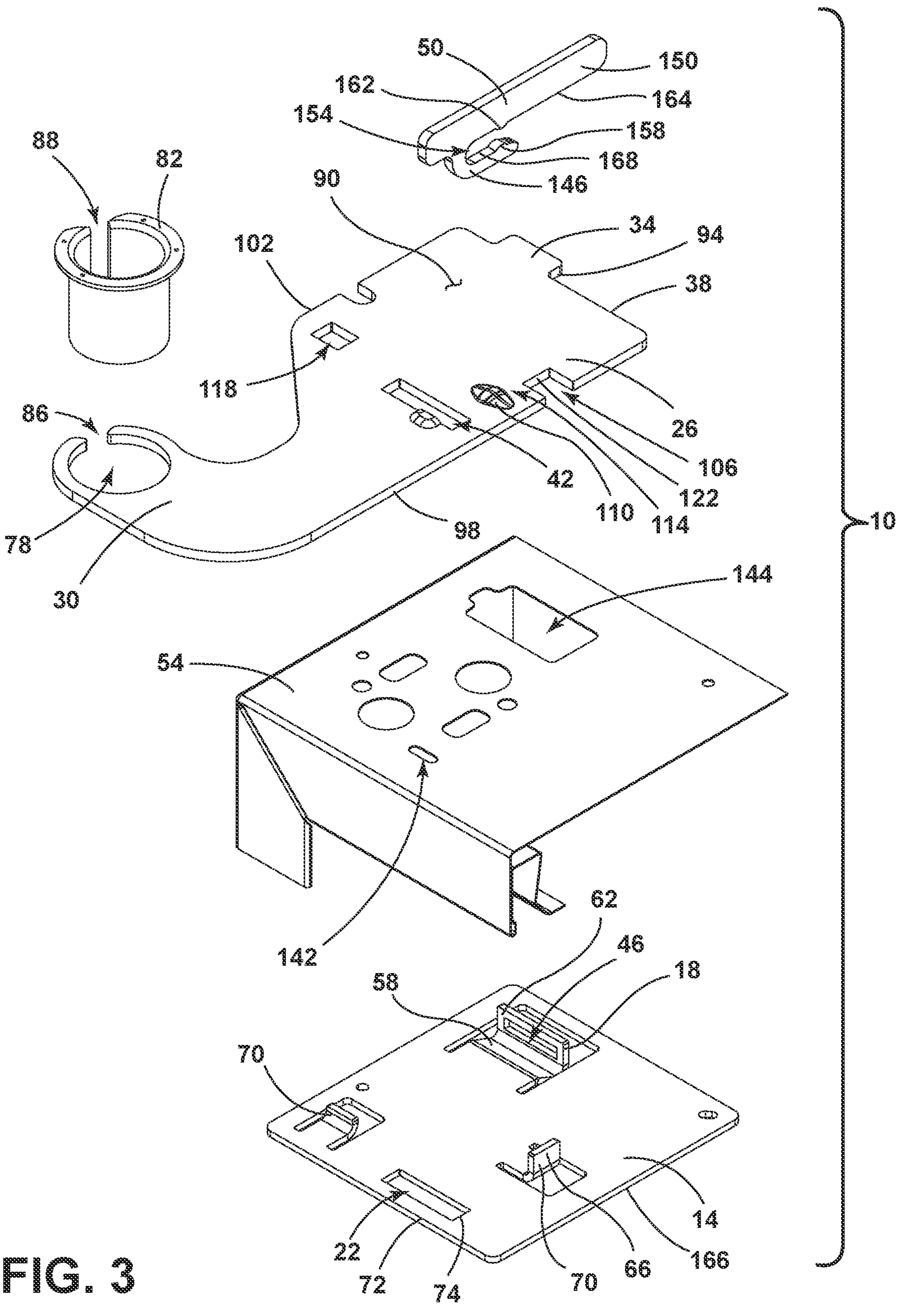
FIG. 3 is an exploded view of the hinge bracket assembly of FIG. 2.
Figure 4:
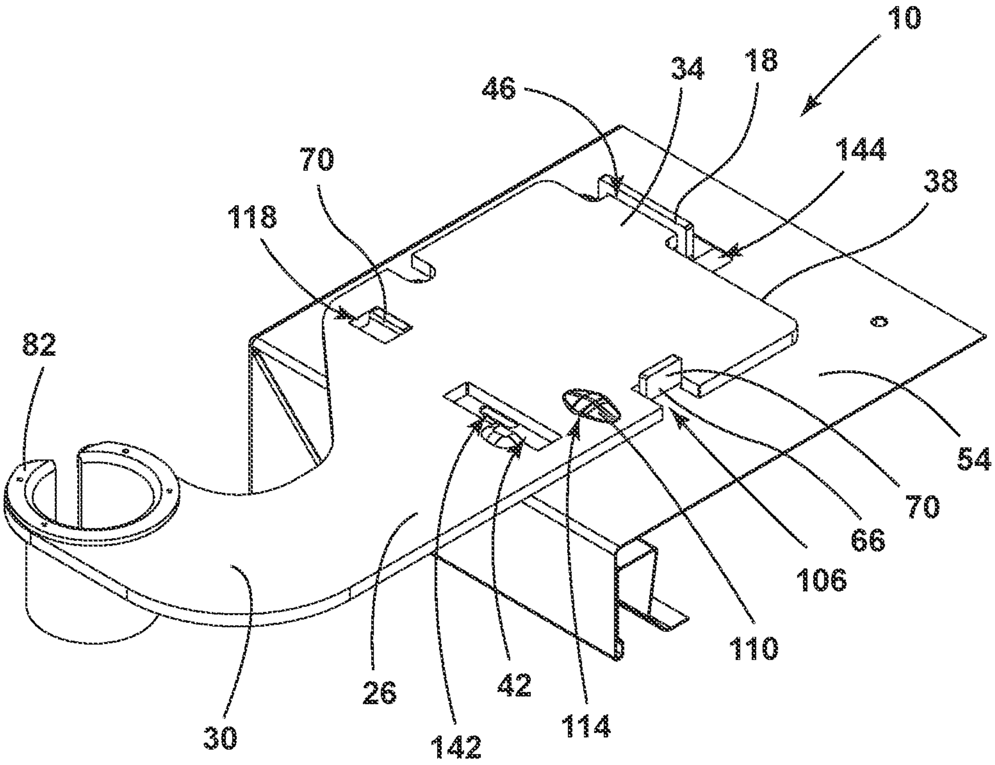
FIG. 4 is a side perspective view of a hinge plate coupled with a wrapper portion and an anchor plate, according to various examples.

Referring now to FIGS. 1B and 2, the hinge bracket assembly 10 is illustrated as including the anchor plate 14 coupled with the hinge plate 26. A wrapper 54 is positioned between the anchor plate 14 and the hinge plate 26. The wrapper 54 may be integrally formed with an appliance wrapper of the cabinet 16. Alternatively, the wrapper 54 may be coupled with the cabinet 16. The locking arm 50 is positioned to couple the anchor plate 14 with the hinge plate 26. The locking arm 50 may further be configured to couple the wrapper 54 between the anchor plate 14 and the hinge plate 26. The locking arm 50 may be rotatable between an unlocked position and a locked position.

Referring now to FIGS. 1B-3, the anchor plate 14 may be generally square, as illustrated. Alternatively, the anchor plate 14 may be rectangular or any other shape without departing from the scope of the present disclosure. As introduced above, the anchor plate 14 may include the retention member 18. The retention member 18 may extend perpendicularly from the anchor plate 14. In various examples, the retention member 18 may be continuously and integrally formed with the anchor plate 14. In other examples, the retention member 18 may be cut from the anchor plate 14 or may be punched through the anchor plate 14 such that the retention member 18 is spaced apart from the anchor plate 14 on at least one side of the retention member 18.

The retention member 18 may include a body portion 58 oriented to be at least partially co-planar with the anchor plate 14 and an arm 62 extending perpendicularly from the body portion 58. The body portion 58 may be substantially linear or may include an arcuate portion to provide for a deflection of the retention member 18 in a direction perpendicular to the anchor plate 14.

The arm 62 of the retention member 18 may define the slot 46 configured to receive the protrusion 34 of the hinge plate 26, as discussed above. The slot 46 may be substantially rectangular, square, or any other shape including linear edges. The slot 46 may extend the width of the arm 62 or may extend only partially across the arm 62. The slot 46 may be sized to receive the protrusion 34 of the hinge plate 26, as discussed in more detail elsewhere herein. The slot 46 may be defined by the arm 62 of the retention member 18 such that the arm 62 secures the protrusion 34 against vertical displacement with little or no deflection.

The anchor plate 14 may further include a stop 66 extending upward from the anchor plate 14. The stop 66 may be one of a plurality of flanges 70 extending substantially perpendicularly from the anchor plate 14. Each of the plurality of flanges 70 may be the same height as the other flanges 70. Alternatively, the stop 66 may extend a greater distance from the anchor plate 14 than the other flanges 70. In some examples, the flanges 70 may be sized such that the top surface of the flange 70 is substantially co-planar with an upper surface 90 of the hinge plate 26. In still other examples, each of the plurality of flanges 70 may extend a unique distance from the anchor plate 14. In still other examples, one or more the plurality of flanges 70 may be substantially the same size. The spacing of the plurality of flanges 70 may be determined by the shape and size of the hinge plate 26, as discussed elsewhere herein.

Each of the plurality of flanges 70 may extend outward from the anchor plate 14 in a direction parallel to the retention member 18. In various examples, the plurality of flanges 70, including the stop 66, may be integrally formed with the anchor plate 14. In other examples, each of the plurality of flanges 70 may be cut from the anchor plate 14 or may be punched through the anchor plate 14 such that the respective flange 70 is spaced apart from the anchor plate 14.

The anchor plate 14 may further define the first receiving aperture 22. The first receiving aperture 22 may be defined proximate a front edge 72 of the anchor plate 14. The first receiving aperture 22 may have a generally rectangular shape and may be sized to at least partially receive the locking arm 50. Elongated edges of the first receiving aperture 22 may be generally parallel with the front edge 72 of the anchor plate 14. The first receiving aperture 22 may further be positioned proximate the stop 66 such that an edge 74 of the first receiving aperture 22 is substantially aligned with the stop 66.

Referring still to FIGS. 1B-4, the hinge plate 26 may be aligned with the anchor plate 14. The hinge plate 26 may include the hinge arm 30 extending from a first side of the hinge plate 26. The hinge arm 30 may be at least partially arcuate such that the hinge arm 30 forms a hook-shape. The hinge arm 30 may define a receiving well 78 at a terminal end of the hook-shaped hinge arm 30. The receiving well 78 may be generally circular and may be in communication with a gap 86. The receiving well 78 may be configured to receive a hinge guide 82 including a vertical space 88 such that the gap 86 and the vertical space 88 are substantially aligned to facilitate coupling of the door 24 with the hinge bracket assembly 10.

The hinge plate 26 may further include the protrusion 34 extending from the edge 38 of a second side of the hinge plate 26. In other words, the protrusion 34 may extend from the edge 38 of the hinge plate 26 opposite the hinge arm 30. The edge 38 may be substantially linear and may be positioned as a rear edge 38 of the hinge arm 30 so that the protrusion 34 is substantially co-planar with the hinge arm 30 and the hinge plate 26. The protrusion 34 may further be generally rectangular and may be sized to complement the slot 46 defined by the retention member 18 of the anchor plate 14. The protrusion 34 may further be sized such to limit movement of the protrusion 34 within the slot 46 by forming a close fit between the protrusion 34 and the slot 46. For example, upper and lower surfaces 90, 94 of the hinge plate 26 at the protrusion 34 may be positioned to abut lateral edges of the slot 46 to prevent vertical shifting of the protrusion 34 within the slot 46. Similarly, the protrusion 34 may have a width that is substantially equal to a width of the slot 46 to prevent inadvertent lateral movement of the hinge plate 26.

As discussed above, the hinge plate 26 defines the second receiving aperture 42. The second receiving aperture 42 may be defined proximate the hinge arm 30 and may have a generally rectangular shape configured to mirror the shape of the first receiving aperture 22. The second receiving aperture 42 may be sized to complement the first receiving aperture 22 and may be sized to at least partially receive the locking arm 50. When the protrusion 34 is received by the slot 46 of the retention member 18, the hinge plate 26 is coupled with the anchor plate 14, and the second receiving aperture 42 is subsequently aligned with the first receiving aperture 22.

The hinge plate 26 may include the rear edge 38 and first and second side edges 98, 102. At least one of the side edges 98, 102 is partially non-linear to form the hinge arm 30. In some examples, the first and second side edges 98, 102 may be partially non-linear and may be oriented substantially parallel to the receiving well 78 of the hinge arm 30.

The first side edge 98 may define a notch 106 having at least one interior linear edge 122. The notch 106 may be sized to receive the stop 66 when the hinge plate 26 is coupled and aligned with the anchor plate 14. In other words, the stop 66 may be received by the notch 106 when the hinge plate 26 is coupled with the anchor plate 14. When the stop 66 is received by the notch 106 and the hinge plate 26 is aligned with the anchor plate 14, the stop 66 may abut the linear edge 122. The stop 66 may further be sized such that the stop 66 forms a substantially close fit within the notch 106 to maintain engagement of the stop 66 with the notch 106. The stop 66 may further be configured to extend past and perpendicular to the upper surface 90 of the hinge plate 26 when the stop 66 is received by the notch 106, as discussed elsewhere herein.

Referring still to FIGS. 1B-4, a generally rounded protuberance 110 may extend from the upper surface 90 of the hinge plate 26. The protuberance 110 may have a generally oblong cross-sectional shape. In some examples, the protuberance 110 may define a guide 114 extending parallel with the first and second side edges 98, 102 of the hinge plate 26. The protuberance 110 may be positioned proximate the notch 106 such that the guide 114 extends parallel with the linear edge 122 of the notch 106. The parallel configuration of the guide 114 and the notch 106 allows the locking arm 50 to be positioned between the protuberance 110 and the stop 66 and/or within the guide 114 to secure the locking arm 50.

The hinge plate 26 may further define a plurality of openings 118 configured to each receive one of the plurality of flanges 70. Each of the plurality of openings 118 may further include a linear edge 126 configured to abut the respective flange 70 when the hinge plate 26 is coupled with the anchor plate 14. For example, each of the plurality of openings 118 may be generally square or rectangular. Each of the plurality of flanges 70 is received by the respective opening 118 to limit movement of the hinge plate 26 when the hinge plate 26 is aligned and coupled with the anchor plate 14. In other words, each of the plurality of flanges 70 may be received by the respective opening 118 when the protrusion 34 is received by the slot 46 of the retention member 18. Each of the plurality of flanges 70 may be configured to act as a stop to prevent inadvertent movement of the hinge plate 26 in a direction perpendicular to the respective flange 70, limiting rotation or sliding of the hinge plate 26 relative to the anchor plate 14.

In the illustrated embodiment of FIGS. 1A-6, the wrapper 54 is configured to fit on a corner of the appliance 12. The wrapper 54 may be shaped to fit any appliance 12 proximate a hinge axis 138 defined by the receiving well 78 and/or the hinge guide 82 of the hinge plate 26, as shown in FIGS. 1A and 1B. The wrapper 54 may further define a wrapper receiving aperture 142 proximate an edge of the wrapper 54. The wrapper receiving aperture 142 may be configured to align with the first and second receiving apertures 22, 42 when the wrapper 54 is positioned between the hinge plate 26 and the anchor plate 14. In various examples, the wrapper receiving aperture 142 may be formed after the wrapper 54 is positioned between the hinge plate 26 and the anchor plate 14. In other examples, the wrapper receiving aperture 142 may be formed before the wrapper 54 is positioned between the hinge plate 26 and the anchor plate 14 and may be configured to expand when the locking arm 50 is positioned within the first and second receiving apertures 22, 42 and the wrapper receiving aperture 142. The wrapper receiving aperture 142 is sized to at least partially receive the locking arm 50 and may be a similar size to the first and second receiving apertures 22, 42. Alternatively, the wrapper receiving aperture 142 may be larger or smaller than the first and second receiving apertures 22, 42 without departing from the scope of the present disclosure. As further shown in FIG. 3, the wrapper 54 further defines an access aperture 144.

Figure 5:
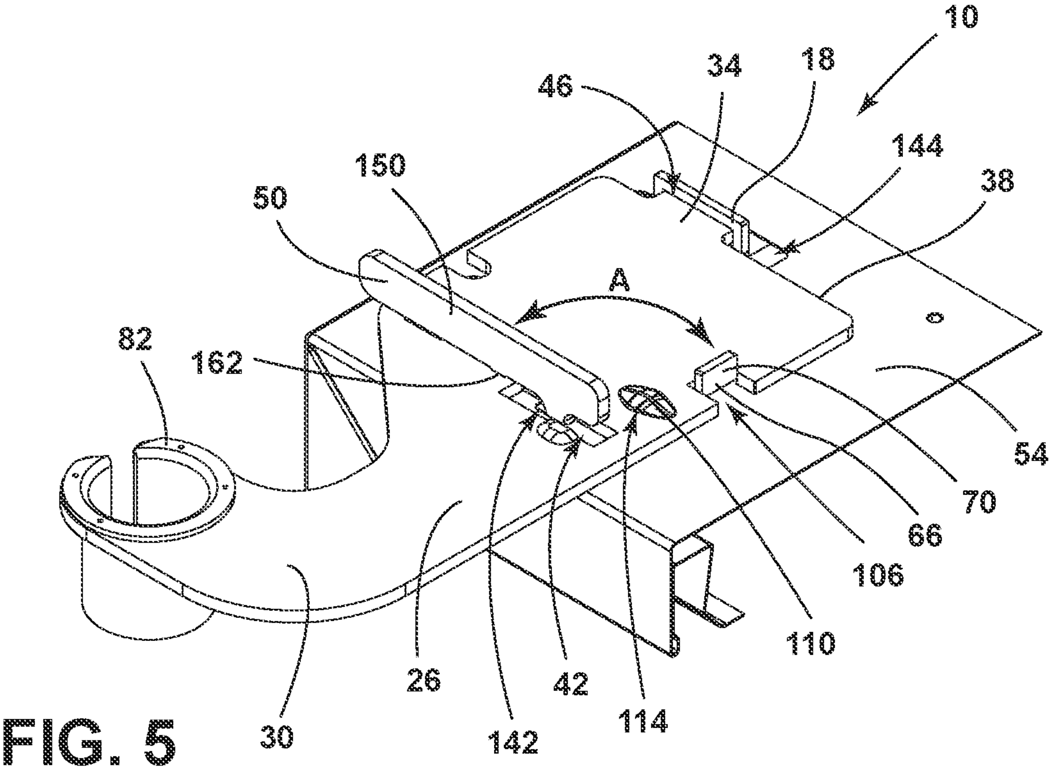
FIG. 5 is a side perspective view of the hinge plate, the wrapper portion, and the anchor plate of FIG. 4 with a locking arm positioned in a first position.
Figure 6:
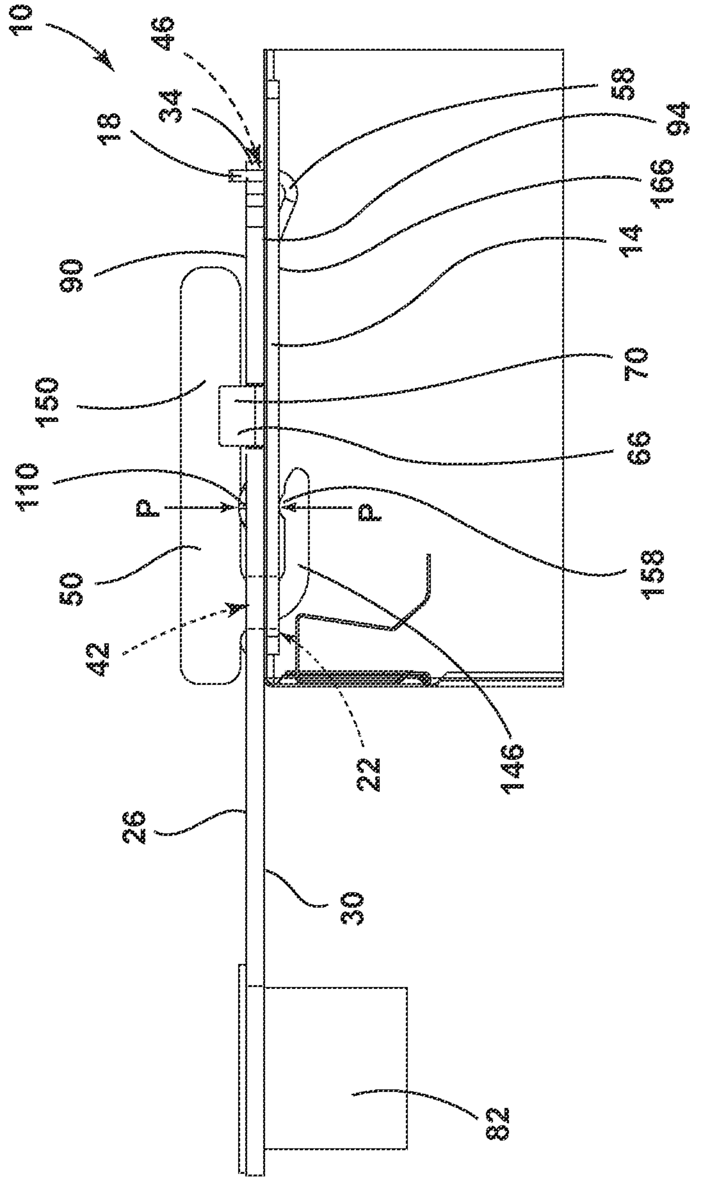
FIG. 6 is a side profile view of the hinge plate, the wrapper portion, and the anchor plate of FIG. 4 with a locking arm positioned in a second position.

As discussed previously, the locking arm 50 is configured to be at least partially received by the first and second receiving apertures 22, 42 and is rotatable between the locked position (FIG. 1B) and the unlocked position (FIG. 5). The locking arm 50 may be configured to securely couple the anchor plate 14 with the hinge plate 26 by applying a clamping pressure P to the upper surface 90 of the hinge plate 26 and a lower surface 166 of the anchor plate 14. The locking arm 50 may include a first portion 146 extending from a second portion 150. The first portion 146 and the second portion 150 may define a channel 154 sized to receive at least the anchor plate 14 and the hinge plate 26.

The first portion 146 is configured to be at least partially received by the first and second receiving apertures 22, 42 and the wrapper receiving aperture 142. The first portion 146 of the locking arm 50 may extend from the second portion 150 of the locking arm 50. In various examples, the first portion 146 may extend from an end of the second portion 150. In other examples, the first portion 146 may extend from a point between ends of the second portion 150. The first portion 146 may be configured as a J-shaped flange extending from an inner edge 164 of the second portion 150 and may have a length that is less than a length of the second portion 150. The inner edge 164 of the second portion 150 may be positioned to be substantially parallel with the upper surface 90 of the hinge plate 26 when the locking arm 50 is received by the first and second receiving apertures 22, 42. The inner edge 164 of the second portion 150 may further be substantially parallel with the inner edge 168 of the first portion 146 such that the first portion 146 and the second portion 150 are substantially parallel and co-planar.

A first tab 158 may extend from an inner edge 168 of the first portion 146 toward the inner edge 164 of the second portion 150. The first tab 158 may be generally rounded and may be configured to provide the clamping pressure P to the lower surface 166 of the anchor plate 14 when the locking arm 50 is in the locked position. Likewise, a second tab 162 may extend from the inner edge 164 of the second portion 150 toward the first tab 158. The second tab 162 may be generally rounded and may be configured to be received by the guide 114 of the protuberance 110 or to abut the protuberance 110. The second tab 162 may be configured to apply the clamping pressure P to the upper surface 90 of the hinge plate 26.

Referring now to FIGS. 2 and 5, when the locking arm 50 is positioned through the first and second receiving apertures 22, 42 and the wrapper receiving apertures 142, the locking arm 50 is in the unlocked position. The locking arm 50 is rotatable along arrow A between the unlocked position and the locked position. As the locking arm 50 rotates between the unlocked position and the locked position, the first and second tabs 158, 162 are movable across the lower surface 166 of the anchor plate 14 and the upper surface 90 of the hinge plate 26, respectively. When the locking arm 50 is in the locked position, the inner edge 164 and/or the second tab 162 of the second portion 150 may be rotated across the protuberance 110 of the hinge plate 26. In some examples, the inner edge 164 and/or the second tab 162 may be received by the guide 114 of the protuberance 110. The protuberance 110 is configured to prevent inadvertent rotation of the locking arm 50 from the locked position into the unlocked position. Further, when the locking arm 50 is in the locked position, the second portion 150 may be positioned to abut the stop 66 of the anchor plate 14, preventing over-rotation of the locking arm 50. In other words, when the locking arm 50 is in the locked position, the second portion 150 of the locking arm 50 may be positioned between the protuberance 110 and the stop 66 to prevent inadvertent rotation of the locking arm 50 in any direction.

Figure 7A:
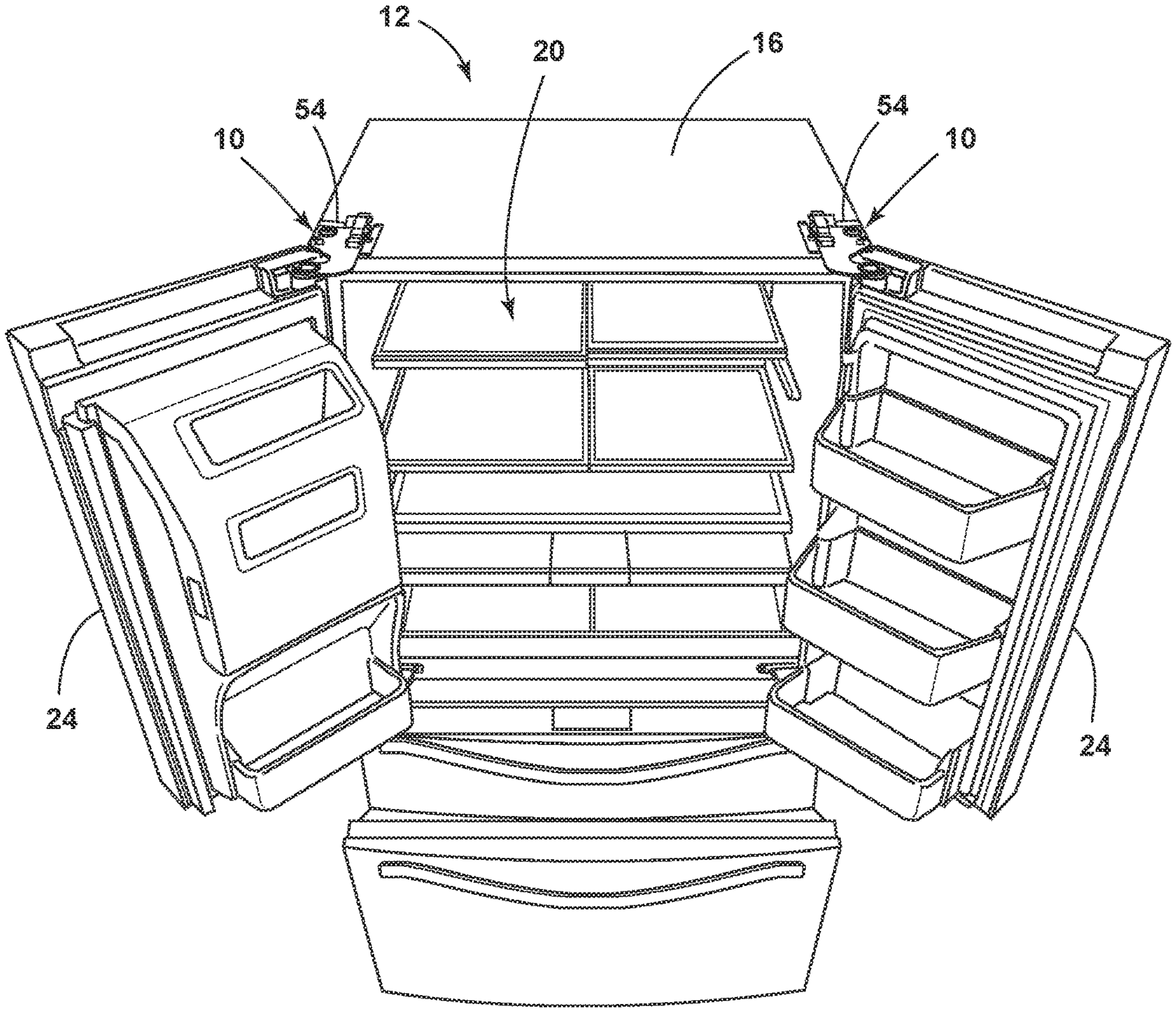
FIG. 7A is a top perspective view of an appliance including a hinge bracket assembly, according to various examples.
Figure 7B:
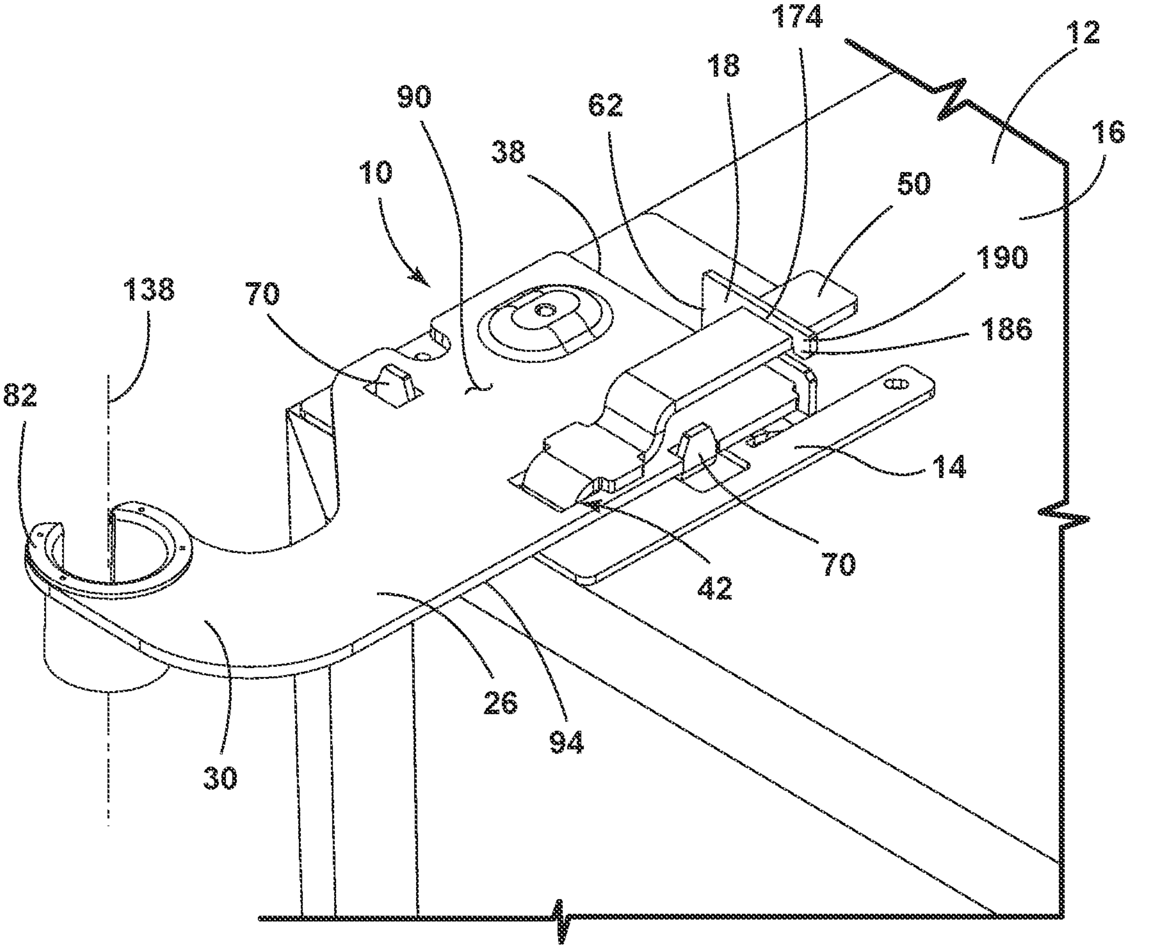
FIG. 7B is a side perspective view of the hinge bracket assembly coupled with the appliance of FIG. 7A.
Figure 8:
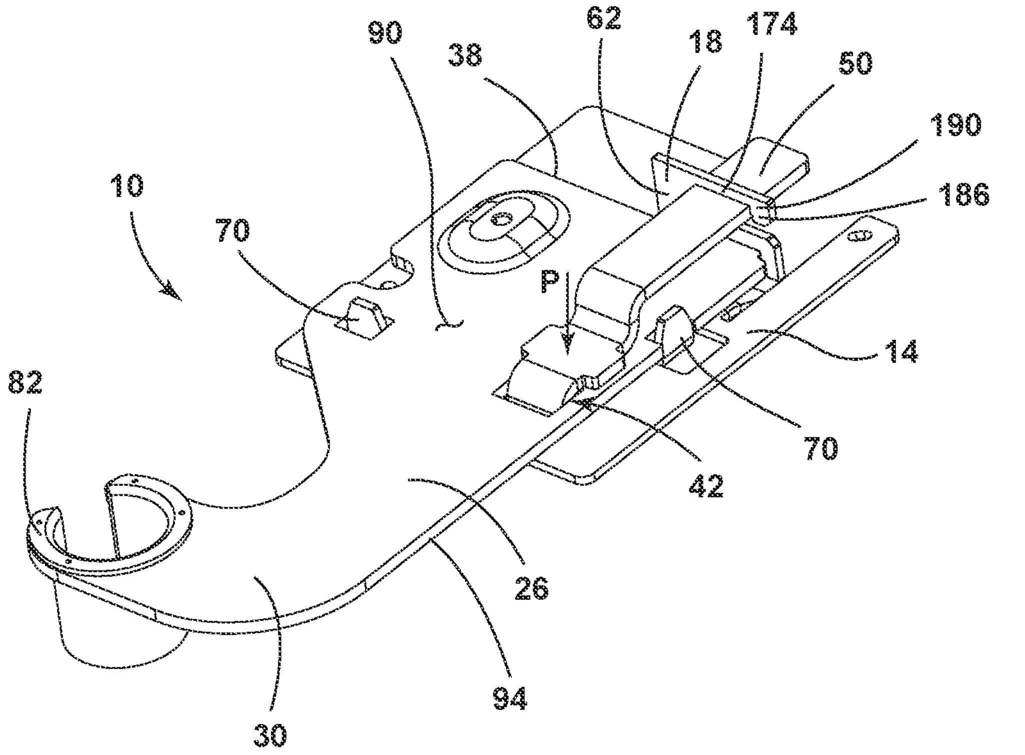
FIG. 8 is a top perspective view of a hinge bracket assembly, according to various examples.
Figure 9:
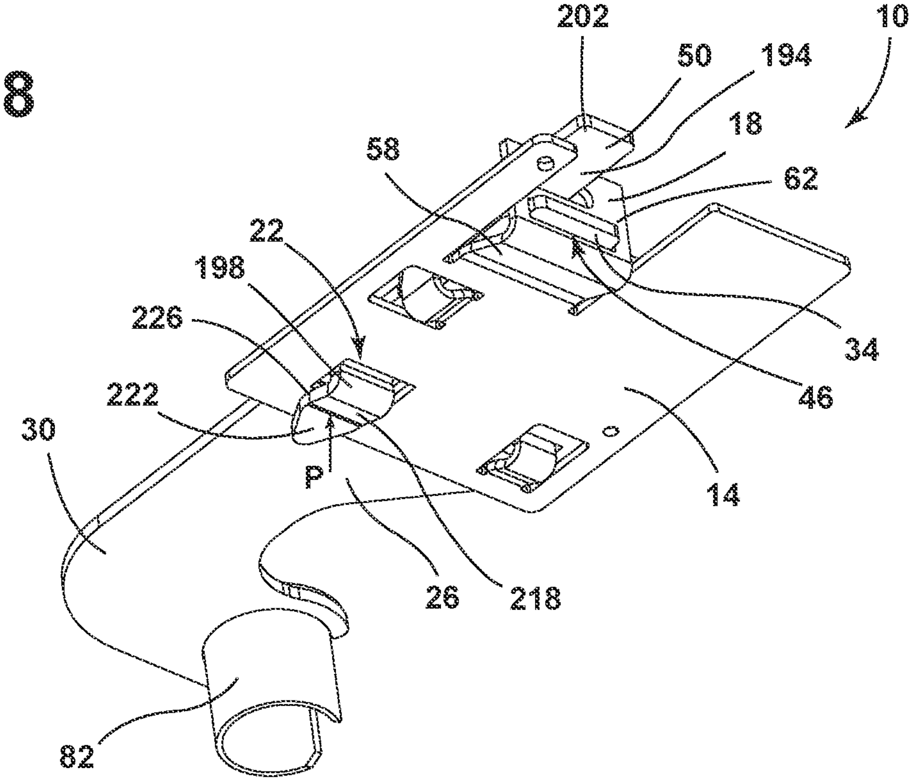
FIG. 9 is a bottom perspective view of the hinge bracket assembly of FIG. 8.

Referring now to FIGS. 7A-8, the appliance 12 is shown including the hinge bracket assembly 10, according to various examples. The hinge bracket assembly 10 includes the anchor plate 14 coupled with the hinge plate 26. As discussed previously, the wrapper 54 may be positioned between the anchor plate 14 and the hinge plate 26. The locking arm 50 may be movable between an unlocked position and a locked position. When the locking arm 50 is in the locked position, the locking arm 50 may be configured to couple the anchor plate 14 with the hinge plate 26.

Referring now to FIGS. 7B-9, the anchor plate 14 may be generally square, as illustrated. Alternatively, the anchor plate 14 may be rectangular or may be any other shape without departing from the scope of the present disclosure. As discussed previously, the anchor plate 14 may include the retention member 18 extending perpendicularly from the anchor plate 14. The retention member 18 may be coupled with or continuously and integrally formed with the anchor plate 14, as discussed with reference to FIGS. 1B and 2. The retention member 18 may include the body portion 58 extending at least partially co-planar with the anchor plate 14 and the arm 62 extending perpendicularly from the body portion 58, as discussed above.

The arm 62 of the retention member 18 may define the slot 46 configured to receive the protrusion 34 of the hinge plate 26, as discussed above. The slot 46 may be substantially rectangular, square, or any other shape including linear edges and may extend any width across the arm 62. The slot 46 may be sized to receive the protrusion 34 of the hinge plate 26. The slot 46 may be defined by the arm 62 of the retention member 18 such that the arm 62 secures the protrusion 34 against vertical displacement with little or no deflection, as discussed elsewhere herein.

The arm 62 may further include a projection 174 forming an upper edge of the arm 62. The projection 174 may at least partially define a retention space 178 in communication with an opening 182. The retention space 178 may be defined to extend parallel with the slot 46. The slot 46 may be defined between the retention space 178 and the anchor plate 14 and/or the body portion 58 of the retention member 18. A lip 186 may extend from a terminal end 190 of the projection 174 and partially into the opening 182. The lip 186 may be configured to act as a stop for the locking arm 50 and may prevent inadvertent release of the locking arm 50 from the retention space 178, as discussed in more detail elsewhere herein.

The anchor plate 14 may further include the plurality of flanges 70 extending substantially perpendicularly from the anchor plate 14. In other words, each of the plurality of flanges 70 may extend outward from the anchor plate 14. Like the retention member 18, the plurality of flanges 70 may be integrally formed with the anchor plate 14 and may be spaced to align the hinge plate 26 with the anchor plate 14, as previously discussed elsewhere herein.

The anchor plate 14 may further define the first receiving aperture 22 having a generally square or rectangular shape. The first receiving aperture 22 may be defined proximate the front edge 72 and may be sized to at least partially receive the locking arm 50. The first receiving aperture 22 may further be defined to align with the retention member 18 of the anchor plate 14, and more specifically to align with the retention space 178 of the retention member 18. Aligning the first receiving aperture 22 and the retention space 178 may facilitate positioning the locking arm 50 at least partially within the retention space 178 of the retention member 18, as discussed in more detail elsewhere herein.

Referring still to FIGS. 7B-9, the hinge plate 26 is positioned to be aligned with the anchor plate 14, as discussed previously. The hinge plate 26 may be substantially similar to the hinge plate 26, as shown in FIGS. 1A-6. The hinge plate 26 may include the hinge arm 30 extending from the first side of the hinge plate 26 and the protrusion 34 extending from the edge 38 of the second side of the hinge plate 26. In other words, the protrusion 34 may extend from the edge 38 of the hinge plate 26 opposite the hinge arm 30, as discussed previously.

The hinge plate 26 may further include the rear edge 38 and the first and second side edges 98, 102. At least one of the side edges 98, 102 may define the notch 106 having at least one interior linear edge 122, as previously described with reference to FIGS. 1A-4. The notch 106 may be sized to receive one of the plurality of flanges 70 when the hinge plate 26 is coupled and aligned with the anchor plate 14. When the respective flange 70 is received by the notch 106, the flange 70 may abut the linear edge 122 defining the notch 106 to prevent sliding of the hinge plate 26 relative to the anchor plate 14 when the hinge plate 26 is coupled with the anchor plate 14.

The hinge plate 26 may define the second receiving aperture 42 proximate the hinge arm 30 and having a generally square shape. The second receiving aperture 42 may be sized to complement the first receiving aperture 22 and to at least partially receive the locking arm 50. When the protrusion 34 is received by the slot 46 of the retention member 18, the hinge plate 26 is coupled and aligned with the anchor plate 14 such that the second receiving aperture 42 is aligned with the first receiving aperture 22.

The hinge plate 26 may further define the plurality of openings 118. Each of the plurality of openings 118 includes a linear edge 122 and may be defined by the hinge plate 26 to receive one of the plurality of flanges 70, as discussed previously with reference to FIGS. 1B-4. Each of the flanges 70 is received by the respective opening 118 to limit rotational movement and/or sliding of the hinge plate 26 when the hinge plate 26 is aligned and coupled with the anchor plate 14.

Figure 10:
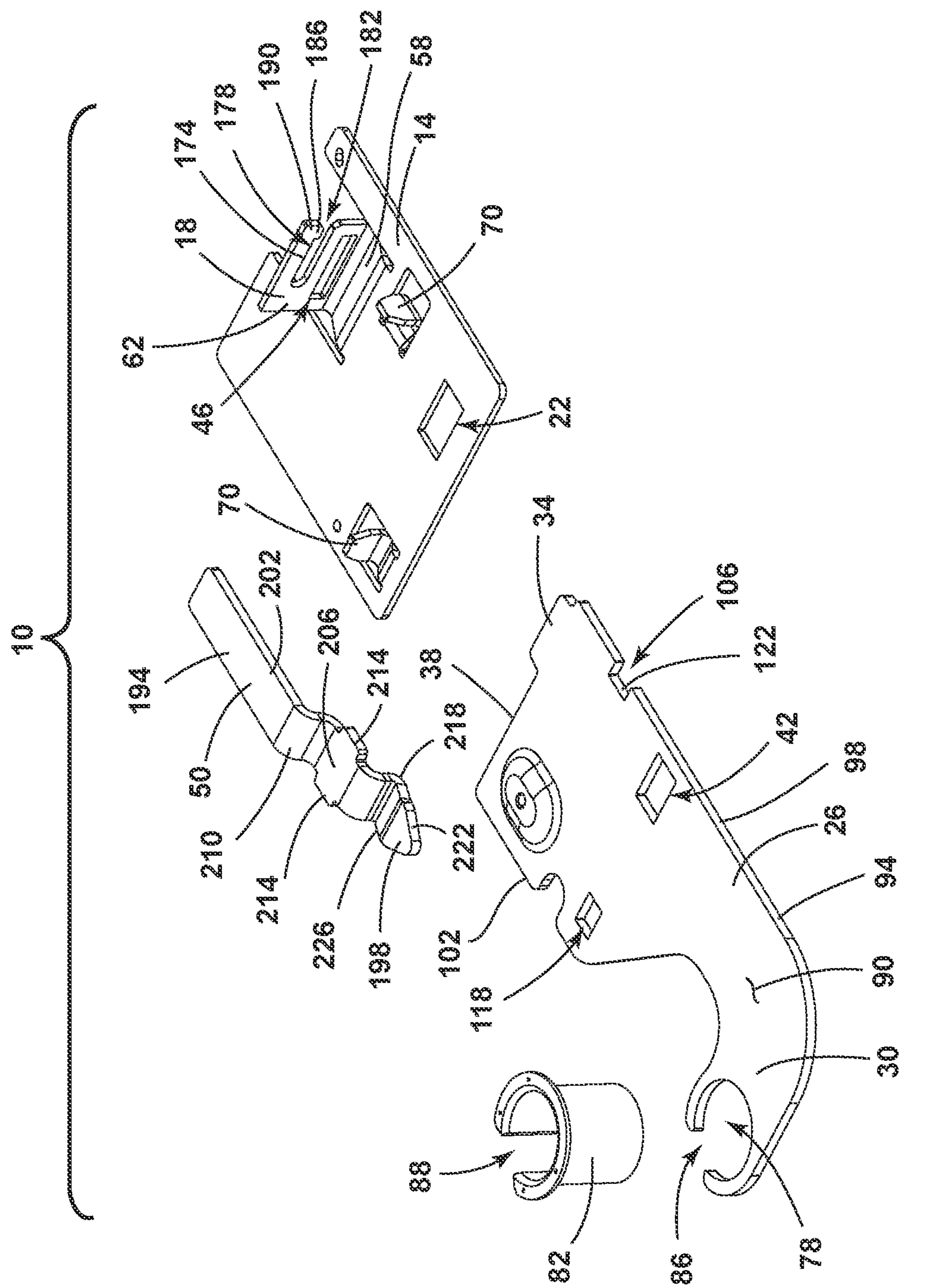
FIG. 10 is an exploded view of the hinge bracket assembly of FIG. 8.
Figure 11:
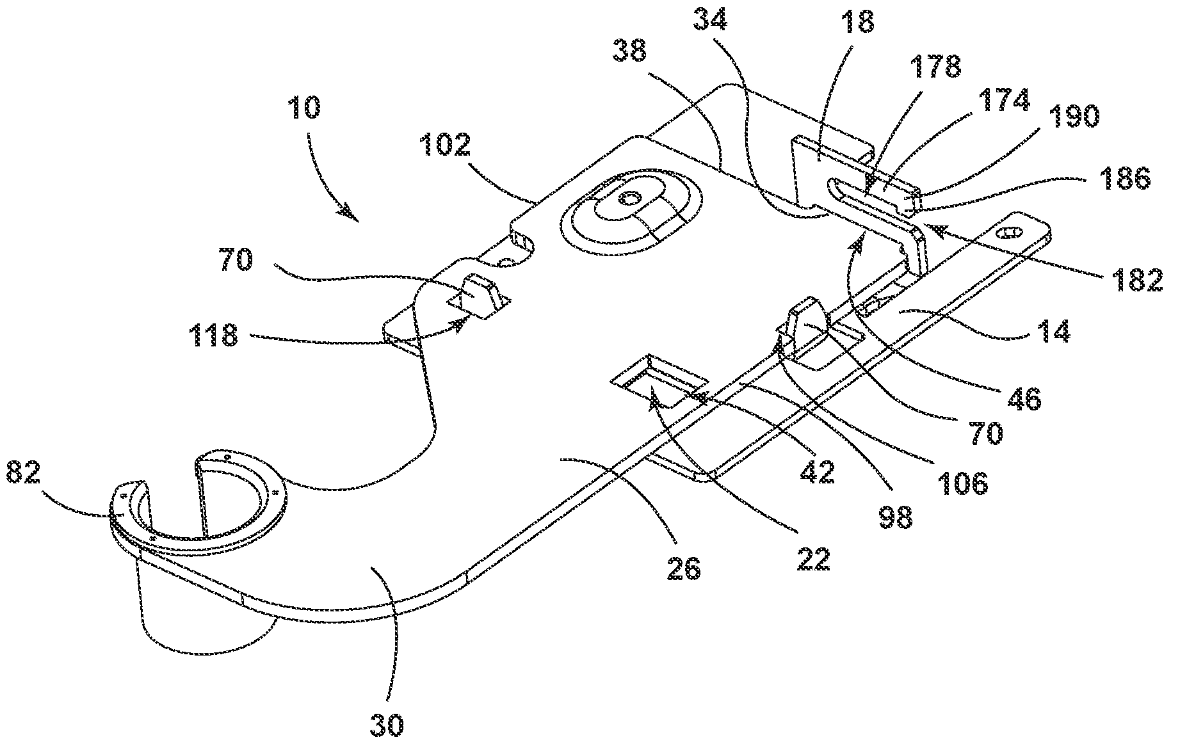
FIG. 11 is a top perspective view of a hinge plate coupled with an anchor plate, according to various examples.

Referring now to FIGS. 7B-12, the locking arm 50 may be movable between the locked position (FIG. 7B) and the unlocked position (FIG. 10). The locking arm 50 may include a body 194 and a nose 198 extending from the body 194. The nose 198 may be at least partially received by the first and second receiving apertures 22, 42 when the locking arm 50 is in the locked position to couple the hinge plate 26 with the anchor plate 14.

The body 194 of the locking arm 50 may include an upper portion 202 and a lower portion 206 continuously formed and spaced apart by a step 210. The upper portion 202 may be configured to be received by, or engaged with, the retention space 178 of the retention member 18 when the locking arm 50 is in the locked position. The lower portion 206 may be substantially flush with the upper surface 90 of the hinge plate 26 when the locking arm 50 is in the locked position. The height of the retention member 18 and the positioning of the retention space 178 may be determined by the spacing of the upper and lower portions 202, 206 of the locking arm 50 as spaced apart by the step 210. In other words, the distance between the upper surface 90 of the hinge plate 26 and the retention space 178 may be substantially equivalent to the height of the step 210 of the body 194 of the locking arm 50.

The lower portion 206 may further include one or more fins 214 extending perpendicular to the upper portion 202 and the lower portion 206. The fins 214 may further be co-planar with the lower portion 206 of the locking arm 50. The fins 214 may be positioned as a pair of opposing fins extending from the lower portion 206 and may be substantially flush with the upper surface 90 of the hinge plate 26 when the locking arm 50 is in the locked position.

The nose 198 may extend from a side of the lower portion 206 of the locking arm 50 opposite the upper portion 202 of the locking arm 50. The nose 198 may include a base portion 218 and an angular portion 222 joined at a vertex. The base portion 218 may extend from the lower portion 206 at a predetermined angle relative to the lower portion 206. Likewise, the angular portion 222 may extend from the lower portion 206 at a predetermined angle to define the vertex. The angular portion 222 may further have a wedge-shape culminating in a point.

The nose 198, including the base portion 218 and the angular portion 222, may be received by the first and second receiving apertures 22, 42. When the locking arm 50 is in the locked position, the base portion 218 may be inclined upward and away from the lower portion 206 of the body 194 toward the lower surface 166 of the anchor plate 14. Similarly, the angular portion 222 may be inclined downward from the lower surface 166 of the anchor plate 14.

A raised surface 226 may be positioned at the vertex between the base portion 218 and the angular portion 222. The raised surface 226 may be generally rounded and may abut the lower surface 166 of the anchor plate 14 when the locking arm 50 is in the locked position. The raised surface 226 may be configured to abut and apply clamping pressure P to the lower surface 166 of the anchor plate 14 to leverage the anchor plate 14 upward toward the hinge plate 26 when the locking arm 50 is in the locked position. Likewise, the fins 214 of the lower portion 206 may be configured to apply clamping pressure P to the upper surface 90 of the hinge plate 26 to couple the anchor plate 14 with the hinge plate 26 when the locking arm 50 is in the locked position, as discussed in more detail below.

Figure 12:
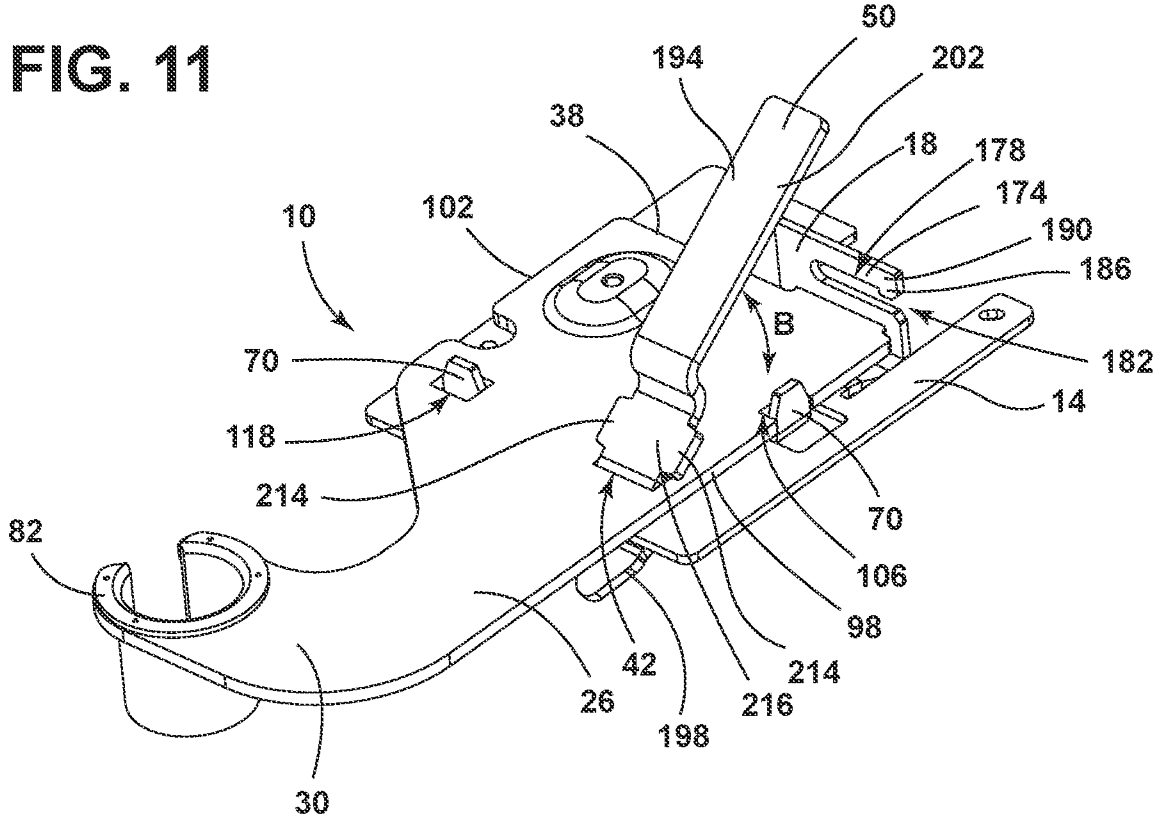
FIG. 12 is a top perspective view of the hinge plate and the anchor plate of FIG. 11 including a locking arm in a first position.

Referring now to FIGS. 8-13, when the hinge plate 26 is aligned with the anchor plate 14 and the protrusion 34 is received by the slot 46 of the retention member 18, the first and second receiving apertures 22, 42 are aligned, as previously discussed. The locking arm 50 may be vertically inserted into the first and second receiving apertures 22, 42. In other words, the locking arm 50 may be oriented in a first position, or an unlocked position. The nose 198 of the body 194 of the locking arm 50 may be received by the first and second receiving apertures 22, 42 until one or both of the fins 214 of the lower portion 206 abut the upper surface 90 of the hinge plate 26, as shown in FIG. 12. The locking arm 50 may then be rotated along arrow B such that the upper portion 202 of the body 194 of the locking arm 50 is substantially parallel with the hinge plate 26 (FIG. 12). In other words, the locking arm 50 may be rotated from the first position into a second position. This rotation orients the lower portion 206 substantially flush with the upper surface 90 of the hinge plate 26.

Figure 13:
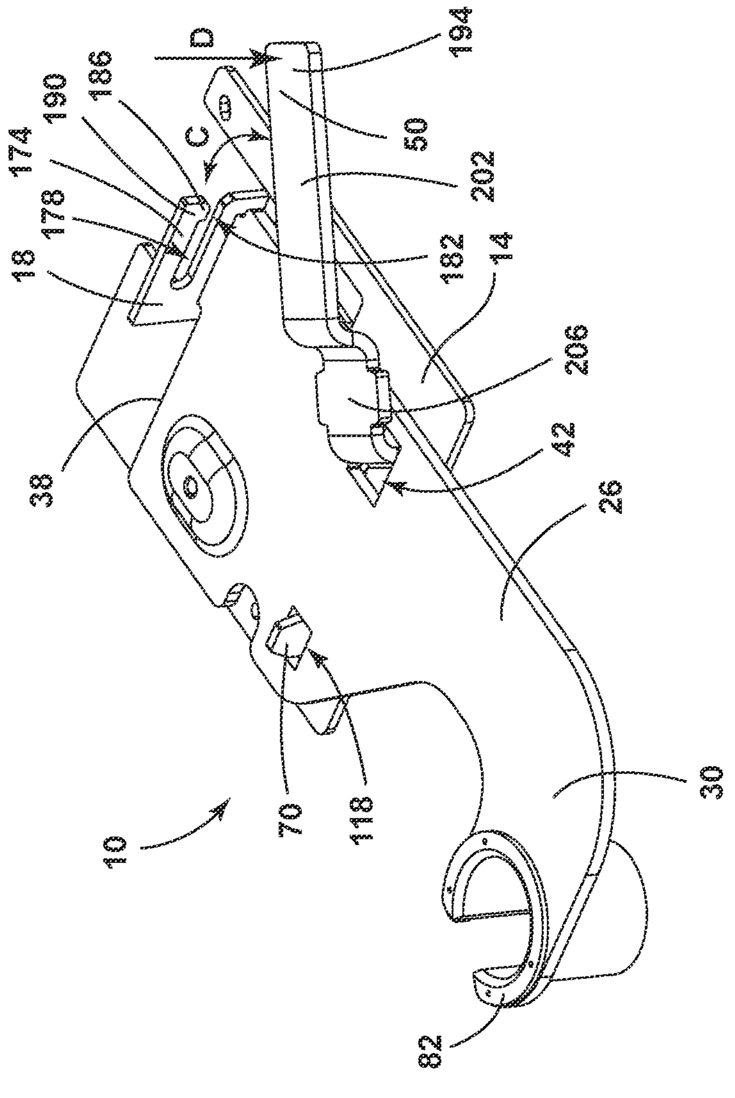
FIG. 13 is a top perspective view of the hinge plate and the anchor plate of FIG. 11 including a locking arm in a second position.

As shown in FIG. 13, the locking arm 50 may then be rotated along arrow C into the retention space 174 of the retention member 18. The upper portion 202 of the body 194 of the locking arm 50 may be depressed along arrow D to allow the locking arm 50 to pass the lip 186 of the projection 174 of the retention member 18 so that the upper portion 202 may be received by the retention space 174. The lip 186 may then act as a stop to prevent inadvertent release of the locking arm 50 from the locked position, or third position.

Referring again to FIGS. 1A-13, the use of the locking arm 50 allows for a faster installation of the hinge plate 26 with the appliance 12. The hinge plate 26 may be aligned with the anchor plate 14 using the raised visible guides (e.g., the retention member 18, the stop 66, and/or the plurality of flanges 70). The locking arm 50 may then be easily inserted into the first and second receiving apertures 22, 42 of the anchor plate 14 and the hinge plate 26, respectively, to couple the hinge plate 26 with the anchor plate 14 without requiring screws or other fasteners that may not be easily removable. The locking arm 50 is movable between the locked and unlocked position by a user, allowing for easier and more efficient coupling and release of the hinge plate 26 and the anchor plate 14. The door 24 may then be installed on the appliance 12 without extensive assembly of the hinge bracket assembly 10.

According to one aspect, a hinge bracket assembly may include an anchor plate. The anchor plate may include a retention member and a stop extending perpendicularly from the anchor plate. The anchor plate may define a first receiving aperture. A hinge plate may include a hinge arm and a protrusion. The protrusion may extend from an edge of the hinge plate opposite the hinge arm. The hinge plate may define a second receiving aperture aligned with the first receiving aperture when the protrusion is received by a slot defined by the retention member to couple the hinge plate with the anchor plate. A locking arm may be rotatable between an unlocked position and a locked position. The locking arm may include a first portion configured to be at least partially received by the first and second receiving apertures. A second portion may be positioned parallel and co-planar with the first portion. The second portion may be configured to abut the stop of the anchor plate when the locking arm is in the locked position.

According to another aspect, a hinge plate may define a notch. A stop may be received by the notch when the hinge plate is coupled with an anchor plate.

According to other aspects, a wrapper may be positioned between an anchor plate and a hinge plate and defining a wrapper receiving aperture. A first portion of a locking arm may be at least partially received by the wrapper receiving aperture.

According to yet another aspect, a hinge plate may include a generally rounded protuberance extending from an upper surface of the hinge plate. A second portion of a locking arm may abut the protuberance and a stop when the locking arm is in a locked position.

According to still other aspects, an inner edge of a first portion of a locking arm may include a tab extending toward a second portion of the locking arm.

According to another aspect, a first portion of a locking arm may be a J-shaped flange extending from a second portion of the locking arm.

According to yet another aspect, a hinge bracket assembly may include an anchor plate including a retention member extending perpendicular to the anchor plate. The retention member may define a slot and a retention space. The slot may be defined between the retention space and the anchor plate. The anchor plate may define a first receiving aperture. A hinge plate may include a hinge arm and a protrusion. The protrusion may extend from an edge of the hinge plate opposite the hinge arm. The hinge plate may define a second receiving aperture aligned with the first receiving aperture when the protrusion is received by the space defined by the retention member. A locking arm may be rotatable between an unlocked position and a locked position. The locking arm may include a body. The body may include an upper portion and a lower portion. A nose may extend from the lower portion and may be positioned at an angle relative to the lower portion. The nose may be received by the first and second receiving apertures and the upper portion may be engaged with the retention space of the retention member when the locking arm may be in the locked position.

According to other aspects, a lower portion of a body of a locking arm may include a fin extending perpendicular to an upper portion of the body and the lower portion.

According to still other aspects, a nose may include a base portion and an angular portion.

According to another aspect, a base portion of a nose may be inclined toward an anchor plate and an angular portion of the nose may be inclined away from the anchor plate when a locking arm is in the locked position.

According to yet another aspect, a nose may include a raised surface abutting a lower surface of an anchor plate when a locking arm is in a locked position. The raised surface may bias the anchor plate toward a hinge plate.

According to other aspects, a retention member may include a projection at least partially defining a retention space. A lip may extend from an end of the projection to retain a locking arm when the locking arm is in a locked position.

According to still other aspects, a hinge bracket assembly may include an anchor plate including a retention member. The retention member may extend perpendicular to the anchor plate. The anchor plate may define a first receiving aperture. A hinge plate may be aligned with the anchor plate and may include a hinge arm and a protrusion. The protrusion may extend from an edge of the hinge plate opposite the hinge arm. The hinge plate may define a second receiving aperture aligned with the first receiving aperture when the protrusion is received by a space defined by the retention member. A locking arm may be rotatable between an unlocked position and a locked position and may be configured to be at least partially received by the first and second receiving apertures to couple the anchor plate and the hinge plate.

According to yet another aspect, a locking arm may include a first portion configured to be at least partially received by first and second receiving apertures. A second portion may be configured to abut a stop extending from an anchor plate when the locking arm is in a locked position.

According to other aspects, a first portion of a locking arm may extend from an edge of a second portion the locking arm and may include a tab extending toward the second portion of the locking arm.

According to another aspect, a wrapper may be positioned between an anchor plate and a hinge plate. The wrapper may define a wrapper receiving aperture aligned with first and second receiving apertures. A locking arm may be at least partially received by the wrapper receiving aperture.

According to yet another aspect, a flange may extend upward from an anchor plate and may be received by an opening defined by a hinge plate. The flange may be may be positioned to limit rotational movement of the hinge plate relative to the anchor plate.

According to still other aspects, a locking arm may include a body having an upper portion and a lower portion. A nose may extend from the lower portion. The nose may be received by first and second receiving apertures when the locking arm is in a locked position.

According to another aspect, a retention member may include a projection at least partially defining a retention space. A lip may extend perpendicularly from an end of the projection to retain a locking arm when the locking arm is in a locked position.

According to still other aspects, a nose of a locking arm may include a base portion inclined toward an anchor plate when the locking arm is in a locked position. An angular portion may be inclined away from the base portion at a vertex. A surface may be positioned at the vertex to abut and apply pressure to the anchor plate when the locking arm is in a locked position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance, comprising:

a wrapper having inner and outer surfaces, a wrapper receiving aperture and an access aperture disposed therethrough;

an anchor plate positioned against the inner surface of the wrapper, the anchor plate including a retention member and a stop, the stop extending perpendicularly from the anchor plate, wherein the retention member includes a body portion and an arm extending upwardly from the body portion through the access aperture of the wrapper, wherein the arm further includes a slot disposed therethrough that is accessible from the outer surface of the wrapper, and further wherein the anchor plate defines a first receiving aperture that is aligned with the wrapper receiving aperture;

a hinge plate positioned against the outer surface of the wrapper, the hinge plate including a hinge arm and a protrusion, the protrusion extending from an edge of the hinge plate opposite the hinge arm, wherein the hinge plate defines a second receiving aperture aligned with the first receiving aperture when the protrusion is received by the slot defined by the arm of the retention member to couple the hinge plate with the anchor plate; and a locking arm rotatable between an unlocked position and a locked position, the locking arm comprising:

a first portion received through the first and second receiving apertures and the wrapper receiving aperture, the first portion including an inner edge having a tab extending outwardly therefrom; and a second portion spaced-apart from the first portion and positioned parallel and co-planar with the first portion to define a channel therebetween, wherein the second portion includes an inner edge having a tab extending outwardly therefrom, such that the tab of the second portion and the tab of the first portion extend towards one another into the channel, and further wherein the second portion is configured to abut the stop of the anchor plate when the locking arm is in the locked position.

2. The appliance of claim 1, wherein the hinge plate defines a notch, and further wherein the stop is received by the notch when the hinge plate is coupled with the anchor plate.

3. The appliance of claim 1, further comprising:

a wrapper positioned between the anchor plate and the hinge plate and defining a wrapper receiving aperture, wherein the first portion of the locking arm is at least partially received by the wrapper receiving aperture.

4. The appliance of claim 1, wherein the hinge plate includes a generally rounded protuberance extending from an upper surface of the hinge plate, wherein the second portion of the locking arm abuts the protuberance and the stop when the locking arm is in the locked position.

5. The appliance of claim 1, wherein the first portion of the locking arm is a J-shaped flange extending from the second portion.

* * * * *